United States Patent [19]
Ishiguro

[11] Patent Number: 5,819,553
[45] Date of Patent: Oct. 13, 1998

[54] ABSORPTION-TYPE AIR-CONDITIONING APPARATUS WITH BY-PASS PIPE LEADING FROM PHASE SEPARATOR TO ABSORPTION CHAMBER

[75] Inventor: Katsusuke Ishiguro, Nagoya, Japan

[73] Assignee: Paloma Industries, Ltd., Aichi, Japan

[21] Appl. No.: 949,139

[22] Filed: Oct. 7, 1997

[30] Foreign Application Priority Data

Oct. 14, 1996 [JP] Japan .................................. 8-293241

[51] Int. Cl.⁶ .................................................. F25B 15/00
[52] U.S. Cl. .................................................. 62/495; 62/105
[58] Field of Search ............................. 62/101, 105, 476, 62/495, 141

[56] References Cited

U.S. PATENT DOCUMENTS 3,137,144  6/1964  Kaufman et al. ............................ 62/495
3,140,591  7/1964  Brown et al. ............................... 62/495

*Primary Examiner*—William Doerrler
*Attorney, Agent, or Firm*—Robin, Blecker & Daley

[57] ABSTRACT

An absorption-type air-conditioning apparatus includes an overflow pipe connecting a phase separator and an absorption chamber. When the apparatus begins operation, and the pressure differential between the phase separator and the evaporation chamber is insufficient to cause the absorption liquid to flow smoothly via dispenser nozzles into the absorption chamber, excessive accumulation of absorption liquid in the phase separator is prevented by allowing the excess liquid to bypass the nozzles via the overflow pipe. When the temperature of the absorption liquid in the phase separator increases so that the pressure differential between the phase separator and the absorption chamber is increased, the overflow pipe is closed, and normal operation of the apparatus proceeds.

13 Claims, 4 Drawing Sheets

ABSORPTION-TYPE AIR-CONDITIONING APPARATUS WITH BY-PASS PIPE LEADING FROM PHASE SEPARATOR TO ABSORPTION CHAMBER

FIELD OF THE INVENTION

This invention is concerned with absorption-type air-conditioning apparatus.

BACKGROUND OF THE INVENTION

In a conventional absorption-type air-conditioning apparatus, an air conditioning operation is performed by continuously repeating condensation and evaporation of a coolant. It is known to use water as a coolant and lithium bromide as an absorption medium. In a conventional design of an absorption-type air-conditioning apparatus, a high temperature regenerator heats a first (low-concentration) lithium bromide aqua solution, and a first phase separator separates the low concentration liquid into steam or coolant vapor and a second (medium concentration) liquid, which has a lower concentration of water and a higher concentration of absorption medium than the first absorption liquid. A high temperature heat exchanger removes heat from the medium concentration liquid produced at the first phase separator. Then, in a second, lower-temperature regenerator, the medium concentration liquid is heated using steam or coolant vapor formed in the first phase separator. A second phase separator separates the heated medium concentration liquid into steam or coolant vapor and a third (high-concentration) liquid which has a lower concentration of water and a higher concentration of absorption medium than the second absorption liquid. The steam or coolant vapor formed in the second phase separator flows to a condenser, which cools and liquifies the steam or coolant vapor. The resulting water or liquid coolant is dispensed into an evaporation chamber.

A low temperature heat exchanger removes heat from the high concentration liquid formed in the second phase separator, and then the high concentration liquid is dispensed through dispenser nozzles into an absorption chamber. The water or coolant dispensed into the evaporation chamber evaporates and turns into water vapor or coolant vapor because of low pressure maintained in the evaporation chamber. The water vapor or coolant vapor produced in the evaporation chamber is absorbed into the high-concentration absorption liquid in the absorption chamber. By absorbing the water vapor or coolant vapor, the high-concentration absorption liquid becomes a low-concentration liquid. A circulation pump circulates the resulting low-concentration liquid to the high temperature regenerator by way of the low and high temperature heat exchangers.

During operation of the above-described apparatus, the pressure in the second phase separator is lower than in the first phase separator. Also, the pressure in the absorption chamber is lower than in the second phase separator. These pressure differences facilitate smooth circulation of the lithium bromide aqua solution from the first phase separator to the second phase separator, and then to the absorption chamber. However, when the apparatus is initially turned on to commence operation, the pressure is substantially the same in all three chambers. Therefore, a problem arises in that the lithium bromide aqua solution does not circulate smoothly. In particular, when a fin-tube type heat exchanger is used in the high temperature regenerator, the pressure in the first phase separator increases rapidly when the apparatus is turned on, and the resulting pressure difference between the first and second phase separators increases rapidly so that the lithium bromide aqua solution flows smoothly into the second phase separator. However, the pressure difference between the second phase separator and the absorption chamber remains relatively small for a period of time until the temperature of the lithium bromide aqua solution in the second phase separator rises to a certain temperature. During this period of time, the lithium bromide aqua solution may be prevented from flowing into the absorption chamber because of flow-resistance in the dispenser nozzles. As a result, the lithium bromide aqua solution tends to accumulate in the second phase separator and may eventually flow into the condenser through the pipe provided for the steam or coolant vapor.

OBJECTS AND SUMMARY OF THE INVENTION

It is accordingly an object of the invention to provide an air-cooled absorption-type air-conditioning apparatus in which absorption liquid is prevented from flowing from the second phase separator into the condenser via a passage provided for steam or coolant vapor.

According to an aspect of the invention, there is provided an absorption-type air-conditioning apparatus which includes a first regenerator for heating a first absorption liquid which is a solution of a liquid coolant and an absorption medium, a first phase separator for receiving heated first absorption liquid from the first regenerator and for separating the heated first absorption liquid into a coolant vapor and a second absorption liquid which has a lower concentration of liquid coolant and a higher concentration of absorption medium than the first absorption liquid, a second regenerator, operating at a lower temperature than the first regenerator, which receives the second absorption liquid from the first phase separator and heats the second absorption liquid by using the coolant vapor outputted from the first phase separator, a second phase separator for receiving heated second absorption liquid from the second regenerator and for separating the heated second absorption liquid into coolant vapor and a third absorption liquid which has a lower concentration of liquid coolant and a higher concentration of absorption medium than the second absorption liquid, a condenser for cooling and liquefying the coolant vapor produced at the second phase separator to form liquid coolant, an evaporation chamber in which the liquid coolant formed at the condenser is dispensed to evaporate in the evaporation chamber, an absorption chamber communicating with the evaporation chamber, the third absorption liquid produced at the second phase separator being dispensed in the absorption chamber for absorbing the liquid coolant evaporated in the absorption chamber, and wherein the second phase separator includes a first outlet from which the third absorption liquid flows for being dispensed on a wall of the absorption chamber, and a second outlet from which the third absorption liquid flows when a quantity of absorption liquid in the second phase separator exceeds a predetermined amount, and the apparatus further includes an overflow pipe for allowing the third absorption liquid to flow from the second outlet of the second phase separator to the absorption chamber and a valve for closing the overflow pipe in response to an increase in the temperature of the third absorption liquid flowing in the overflow pipe.

The valve may be a thermal valve of the type which includes a bellows filled with a material that expands in response to the increase in temperature of the absorption liquid flowing in the overflow pipe. The evaporation and absorption chambers may be provided separately, or alternatively may be combined into a single evaporation-absorption chamber, in which the liquid coolant is dispensed to evaporate in the evaporation-absorption chamber, and in which the third absorption liquid is dispensed for absorbing the liquid coolant which evaporates in the evaporation-absorption chamber. In that case, it is to be understood that the overflow pipe allows excess third absorption liquid in the phase separator to flow to the evaporation-absorption chamber.

As an alternative to closing the valve on the basis of the temperature of the absorption liquid in the overflow pipe, means may be provided to close the valve when the pressure in the second phase separator exceeds a predetermined level or when the difference in pressure between the second phase separator and the evaporation-absorption chamber exceeds a predetermined level.

With the apparatus provided in accordance with the invention, including an overflow pipe leading from the second phase separator to the absorption chamber, and a valve for controlling the overflow pipe, excess absorption liquid, which may accumulate in the second phase separator when the air-conditioning apparatus is first turned on, is prevented from flowing to the condenser. Instead, the excess absorption liquid is led to a lower portion of the absorption chamber through the overflow pipe, bypassing dispensing structure such as dispenser nozzles. When the temperature of the absorption liquid in the second phase separator reaches a certain temperature, the valve controlling the overflow pipe is closed. By that time, the pressure differential between the second phase separator and the absorption chamber is sufficient to cause the absorption liquid to flow smoothly from the second phase separator to the absorption chamber through the dispenser nozzles. Alternatively, as noted above, the closing of the valve may be triggered on the basis of the pressure in the second phase separator.

DESCRIPTION OF PREFERRED EMBODIMENTS

Figure 1:
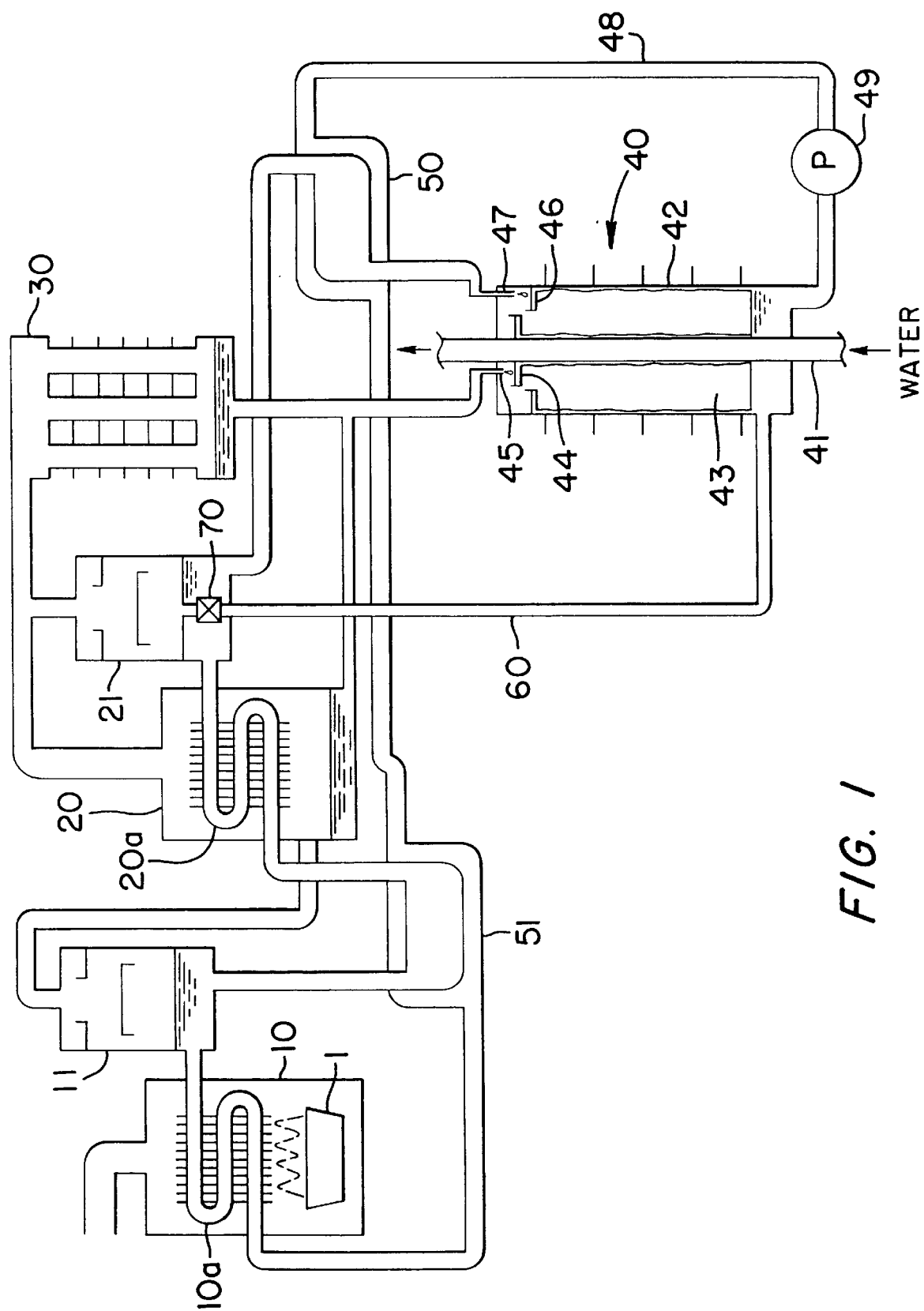
FIG. 1 is a schematic representation of an absorption-type air-conditioning apparatus provided in accordance with the invention.

An embodiment of the invention will now be described with reference to FIG. 1. The absorption-type air-conditioning apparatus illustrated in FIG. 1 includes a high temperature regenerator 10, a first phase separator 11, a low temperature regenerator 20, a second phase separator 21, a condenser 30, and a double tube section 40. In the high temperature regenerator 10, a burner 1 heats a low concentration liquid as the low concentration liquid flows through a fin-tube-type heat exchanger 10a. The first phase separator 11 separates the low concentration liquid heated by the high temperature regenerator 10 into steam or coolant vapor and a medium-concentration liquid. The low temperature regenerator 20 re-heats the medium concentration liquid that flows through a fin-tube-type heat exchanger 20a by using steam or coolant vapor produced at the first phase separator 11. The second phase separator 21 separates the medium-concentration liquid heated by the low temperature regenerator 20 into steam or coolant vapor and a high-concentration liquid. The condenser 30 cools and liquifies the steam or coolant vapor produced at the second separator 21. A double tube section 40 functions as a combined evaporation and absorption chamber. A fan which is not shown in the drawings directs air to the condenser 30 and the double tube section 40.

The first phase separator 11 is positioned at an elevation higher than the second phase separator 21 to assist the flow of the lithium bromide aqua solution from the first phase separator to the second phase separator. The high and low temperature regenerators 10 and 20 respectively heat the lithium bromide aqua solution which flows in the fin-tube-type heat exchangers 10a and 20a. Consequently, the absorption liquid is heated efficiently and the apparatus quickly becomes ready for use after it is turned on.

The double tube section 40 includes a water pipe 41 and an outer pipe 42. A coolant such as water circulates through the water pipe 41 and is supplied to a room unit, which is not shown. The outer pipe 42 is positioned to surround the water pipe 41 to form an evaporation-absorption chamber 43 between the water pipe 41 and the outer pipe 42. A circular reception tray 44 is provided at the outer surface of the water pipe 41 in the evaporation-absorption chamber 43. Water or liquid coolant produced at the condenser 30 and the low temperature generator 20 is dripped down to the circular reception tray 44 through dispenser nozzles 45. The water or liquid coolant is then dispensed onto the outer surface of the water pipe 41 through holes provided at the bottom of the circular reception tray 44.

Similarly, a circular reception tray 46 is provided at the inner surface of the outer pipe 42 within the evaporation-absorption chamber 43. The high-concentration absorption liquid produced at the second phase separator 21 is dripped down to the circular reception tray 46 through dispenser nozzles 47. The high-concentration liquid is then dispensed onto the inner surface of the outer pipe 42 through holes provided at the bottom of the circular reception tray 46. The water or liquid coolant dispensed on the outer surface of the water pipe 41 evaporates because low pressure is maintained in the evaporation-absorption chamber 43. The evaporation of the water or coolant removes heat from the water circulating the water pipe 41 and cools the water in the water pipe 41. The room unit (not shown) performs a cooling operation by using the cooled water circulating in the water pipe 41. The evaporated water or liquid coolant in the evaporation-absorption chamber 43 is immediately absorbed by the high-concentration absorption liquid flowing down the inner surface of the outer pipe 42. The absorption of the water or coolant vapor by the high-concentration liquid releases heat, which is removed by the air flow (generated by the fan which is not shown) over the outer surface of the outer pipe 42.

An overflow pipe 60 is provided in association with the second phase separator 21 and provides a passage between the second phase separator 21 and a lower portion of the evaporation-absorption chamber 43 by means of an opening in the outer pipe 42. A thermal valve 70 is provided in the overflow pipe 60. The valve 70 is in an open or closed position depending on the temperature of the absorption liquid in the second phase separator 21. Preferably, the thermal valve 70 is located within the second phase separator 21 so that there are no joints or other interfaces exposed to the outside of the apparatus. This helps to prevent the lithium bromide aqua solution from leaking from the apparatus.

Figure 2:
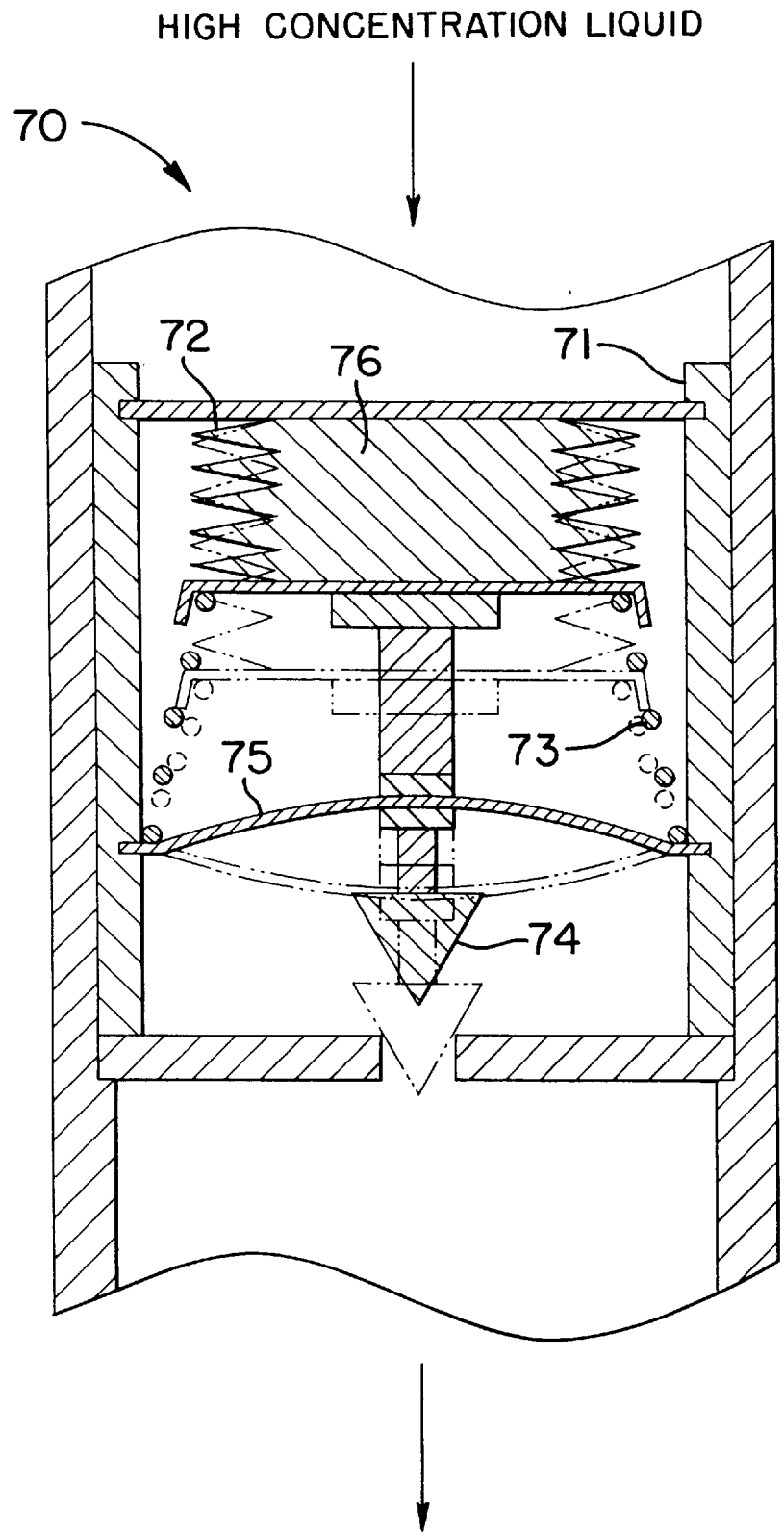
FIG. 2 illustrates certain details of a valve provided to control an overflow pipe in the apparatus of FIG. 1.

Details of the thermal valve 70 are shown in FIG. 2. The thermal valve 70 includes a bellows 72, a spring 73, a plug 74, and a dual-position spring plate 75. The bellows 72 is connected to a housing 71. The spring 73 biases the bellows 72 in an upward position. The plug 74 is mounted on the bottom surface of the bellows 72. The dual-position spring plate 75 is connected to the housing 71 and to a part of the plug 74. A thermal element 76, such as wax, ether, or alcohol, is contained inside the bellows 72. When the temperature of the thermal element 76 is increased, it expands to extend the bellows 72. When this happens, the bellows 72 pushes the plug 74 down. When the temperature of the lithium bromide aqua solution flowing through the overflow pipe 60 (FIG. 1) exceeds a certain level (for example, 100° C.), the bellows 72 pushes the dual-position spring plate 75 downward so as to flip the spring plate 75 to the position indicated in phantom in FIG. 2. The plug 74 is then positioned to close the valve and the overflow pipe 60.

The apparatus also includes a circulation pump 49 provided in a liquid circulation passage 48 between the evaporation-absorption chamber 43 and the high temperature regenerator 10. The circulation pump 49 circulates low-concentration liquid formed in the evaporation-absorption chamber 43 to the high temperature regenerator 10 via a low temperature heat exchanger 50 and a high temperature heat exchanger 51 which are also provided on the liquid circulation passage 48.

The low temperature heat exchanger 50 allows heat to be transferred from the high-concentration liquid produced at the second phase separator 21 to the low-concentration liquid flowing through the passage 48. The high temperature heat exchanger 51 allows heat to be transferred from the medium-concentration liquid produced at the phase separator 11 to the low-concentration liquid flowing through the passage 48.

Operation of the above-described absorption-type air-conditioning apparatus will now be explained. A switch, which is not shown, is placed in an ON position to commence operation of the apparatus. The circulation pump 49 then begins operating and the burner 1 is ignited. The burner 1 heats the lithium bromide aqua solution flowing through the fin-tube-type heat exchanger 10a of the high temperature regenerator 10. As the temperature of the lithium bromide aqua solution rises, the pressure in the first phase separator 11 is increased. The increase in pressure causes a pressure differential between the first and second phase separators 11 and 21, and the pressure differential causes the lithium bromide aqua solution to flow to the low temperature regenerator 20. However, the temperature of the lithium bromide aqua solution in the second phase separator 21 remains low for a period of time so that there is little difference in pressure between the second phase separator 21 and the evaporation-absorption chamber 43. The dispenser nozzles 47 resist the flow of lithium bromide aqua solution through the nozzles 47 and prevent the solution from flowing smoothly into the evaporation-absorption chamber 43 from the second phase separator 21. Therefore, an increasing quantity of the lithium bromide aqua solution accumulates in the second phase separator 21. When the lithium bromide aqua solution accumulated in the second phase separator 21 exceeds a certain level, the excess lithium bromide aqua solution is allowed to bypass the dispenser nozzle 47 by flowing through the overflow pipe 60 to the evaporation-absorption chamber 43. This prevents an excessive accumulation of the lithium bromide aqua solution in the second phase separator 21, so that the lithium bromide aqua solution does not flow into the condenser 30.

After the apparatus has continued in operation for a period of time, the temperature of the lithium bromide aqua solution in the second phase separator 21 rises and increases the pressure in the second phase separator 21, so that there is a pressure differential between the second phase separator 21 and the evaporation-absorption chamber 43. This pressure differential is substantial enough to promote a smooth flow of lithium bromide aqua solution from the second phase separator 21 into the evaporation-absorption chamber 43 via the dispenser nozzles 47. At the same time, the increased temperature of the lithium bromide aqua solution flowing through the overflow pipe 60 causes the thermal valve 70 to close. As a result, with the increase in temperature in the lithium bromide aqua solution, normal operation of the air-conditioning apparatus proceeds.

The absorption-type air-conditioning apparatus provided in accordance with the invention has advantages which include the following.

When the lithium bromide aqua solution in the second phase separator exceeds a certain level as the operation of the apparatus begins, the excess lithium bromide aqua solution flows to the evaporation-absorption chamber while bypassing the dispenser nozzles. This prevents the lithium bromide aqua solution from overflowing into the condenser 30. Once the temperature of the lithium bromide aqua solution increases, the overflow pipe 60 is closed so that the solution no longer flows through the overflow pipe 60 from the second phase separator to the evaporation-absorption chamber. This promotes highly efficient operation of the apparatus. Also, the thermal valve 70 used to open and close the overflow passage allows the design of the apparatus to be simple and the cost thereof to be reduced. In addition, locating the thermal valve 70 inside the second phase separator 21 helps to prevent the lithium bromide aqua solution from leaking from the apparatus.

The combination of the evaporation and absorption chambers into a single evaporation-absorption chamber formed between the water pipe 41 and the outer pipe 42 also helps to simplify the structure of the apparatus. The size, weight and manufacturing cost of the apparatus are reduced. Also, the coolant vapor is absorbed efficiently by the high-concentration absorption liquid because evaporation and absorption occur via surfaces that face each other in the evaporation-absorption chamber 43. In addition, cooling is performed over the entire circumference of the water pipe 41, which promotes efficiency of the apparatus.

Because the air-conditioning apparatus described herein uses fin-tube-type heat exchangers 10a and 20a in the high and low temperature regenerators 10 and 20, only a rather small amount of lithium bromide aqua solution is required. Therefore, the solution can be warmed up quickly, and the apparatus commences operation quickly. Also, the overall weight of the apparatus is reduced.

Further, the fin-tube-type heat exchangers permit the absorption liquid to be heated efficiently. In addition, the respective fin-tube-type heat exchangers 10a and 20a (of the high and low temperature regenerators 10 and 20, respectively) are formed with identical structures so that the apparatus can be produced economically.

Although the embodiment of the invention described above utilizes a thermal valve 70 to open and close the overflow pipe 60, other types of valves may be used, so long as the valve is opened and closed depending on the temperature. For example, an electromagnetic valve and a temperature sensor may be used, with the temperature sensor measuring the temperature of the lithium bromide aqua solution in the second phase separator 21, and the valve being controlled on the basis of the temperature as measured by the temperature sensor.

It should also be understood that the valve need not be positioned inside the phase separator. Rather, the valve may be placed anywhere along the overflow pipe 60.

Figure 3:
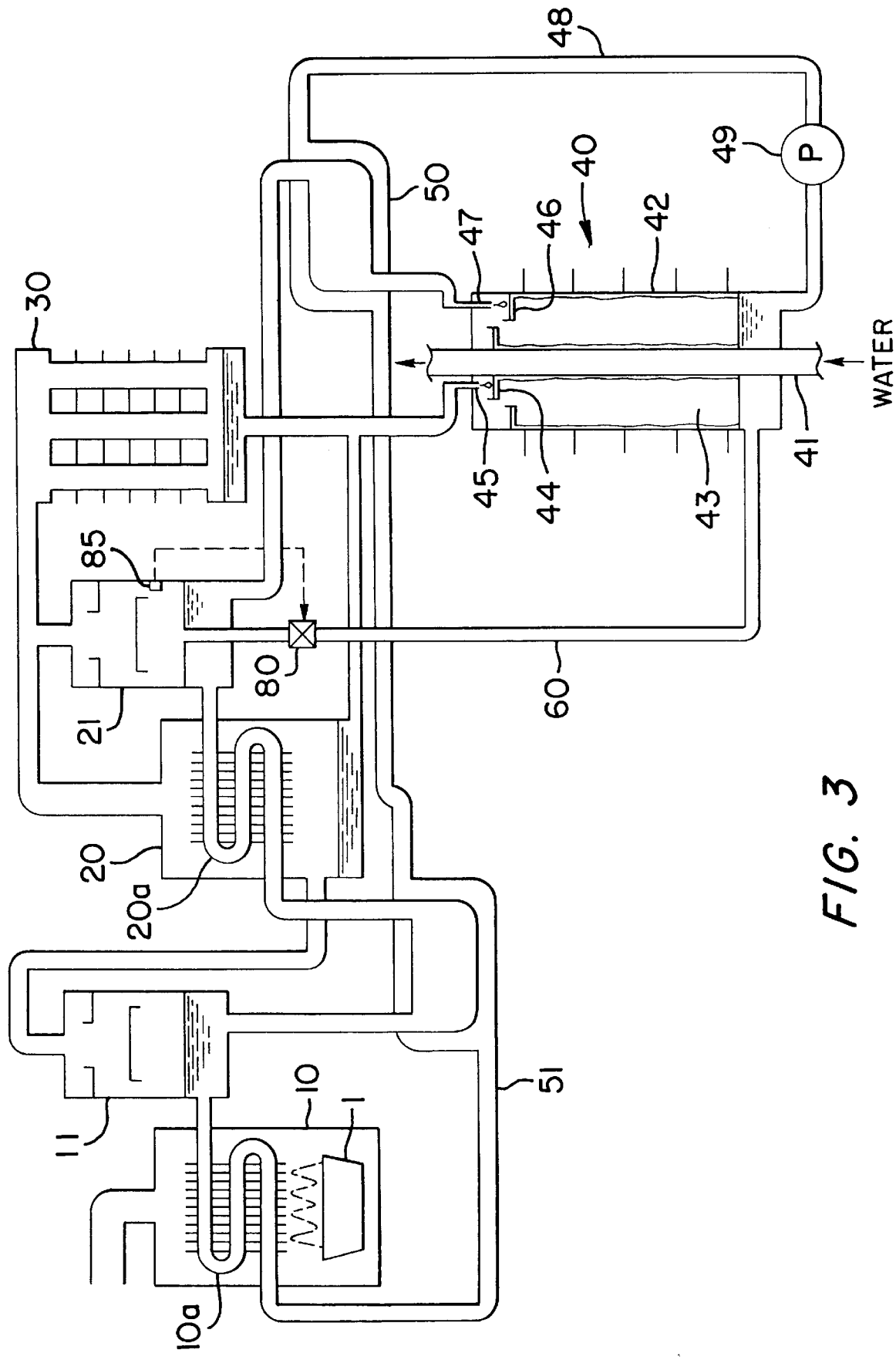
FIG. 3 is a schematic representation of an absorption-type air-conditioning apparatus provided according to an alternative embodiment of the invention.

As an alternative to controlling the overflow pipe valve on the basis of the temperature of the absorption liquid, the valve may be controlled on the basis of pressure levels in the air-conditioning apparatus. For example, in an alternative embodiment shown in FIG. 3, an electromagnetic valve 80 is provided on the overflow pipe 60, and the opened or closed condition of the valve 80 is controlled by a pressure switch 85 provided at the second phase separator 21. The pressure switch 85 switches between on and off conditions depending on the pressure level of the lithium bromide aqua solution in the second phase separator 21. When the pressure in the second phase separator 21 reaches or exceeds a predetermined level, the pressure switch 85 causes the electromagnetic valve 80 to close.

Figure 4:
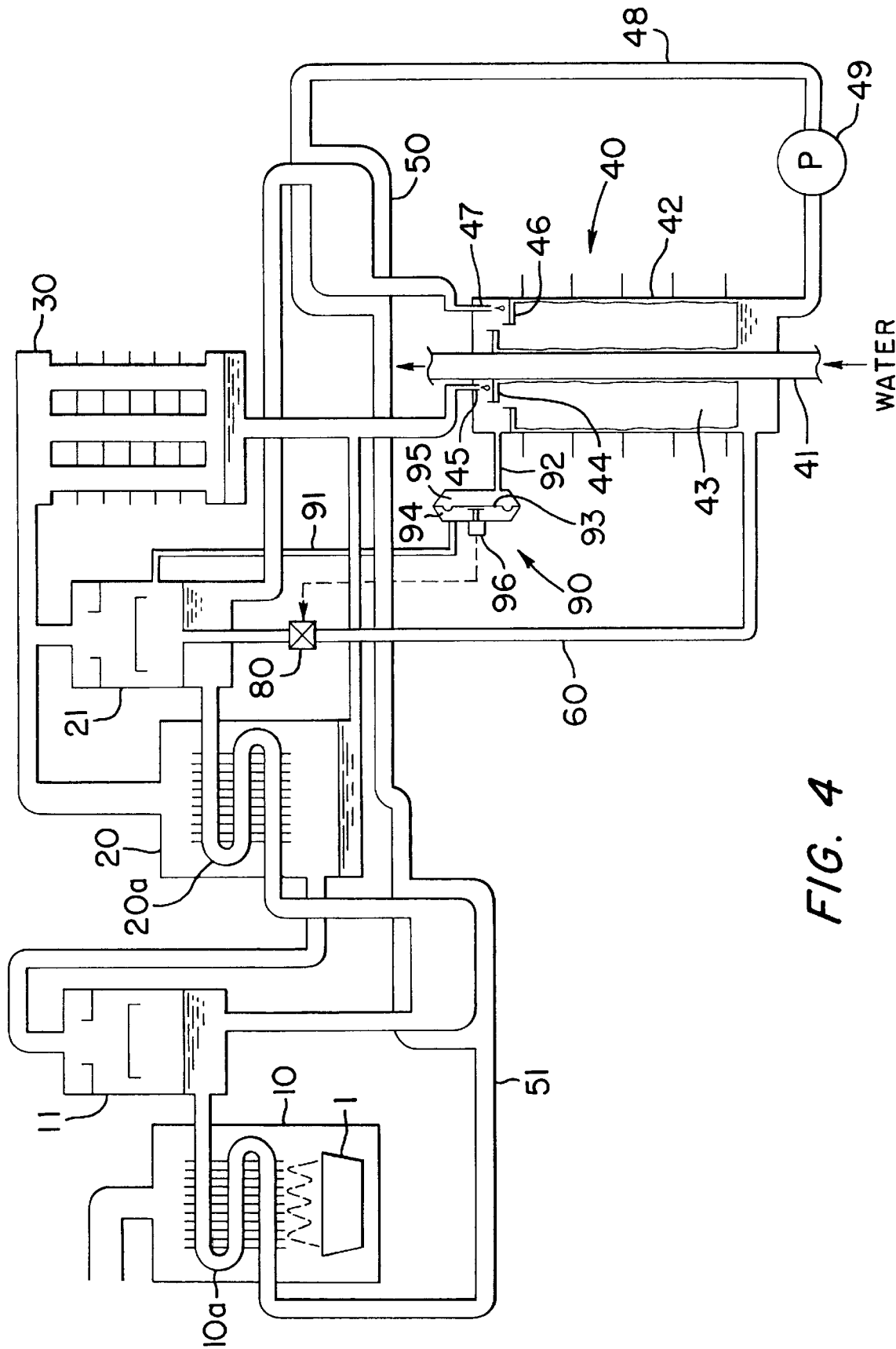
FIG. 4 is a schematic representation of an absorption-type air-conditioning apparatus provided according to another alternative embodiment of the invention.

Another alternative embodiment of the air-conditioning apparatus is shown in FIG. 4. In this embodiment, the electromagnetic valve 80 is controlled in the basis of the difference in pressure levels between the second phase separator 21 and the evaporation-absorption chamber 43. The embodiment of FIG. 4 includes a pressure switch 90, which has a first chamber 94 and a second chamber 95. The chambers 94 and 95 are separated by a diaphragm 93. A pressure conduction pipe 91 connects the second phase separator 21 to the first chamber 94. A pressure conduction pipe 92 connects the evaporation-absorption chamber to the second chamber 95 of the pressure switch 90. The pressure switch 90 is designed so that, when the difference in pressure between the second phase separator 21 and the evaporation-absorption chamber 43 exceeds a predetermined level, a contact point 96 is actuated to cause the electromagnetic valve 80 to close.

Although the embodiments shown herein provide an overflow pipe 60 only in association with the second phase separator 21, it should be understood that an overflow pipe may also be associated with the first phase separator 11. Moreover, although the double tube section 40 is shown as being in a cylindrical shape, other shapes, including those having a polygonal cross-section, may be used.

Also, coolants other than water and absorption media other than lithium bromide may be used.

Various changes to the foregoing embodiments and practices may be introduced without departing from the invention. The particularly preferred embodiments and practices are thus intended in an illustrative and not limiting sense. The true spirit and scope of the invention are set forth in the following claims.

What is claimed is:

1. An absorption-type air-conditioning apparatus, the apparatus comprising:
    a first regenerator for heating a first absorption liquid which is a solution of a liquid coolant and an absorption medium,
    a first phase separator for receiving heated first absorption liquid from said first regenerator and for separating the heated first absorption liquid into a coolant vapor and a second absorption liquid which has a lower concentration of liquid coolant and a higher concentration of absorption medium than said first absorption liquid;
    a second regenerator, operating at a lower temperature than said first regenerator, for receiving said second absorption liquid from said first phase separator and heating said second absorption liquid by using said coolant vapor outputted from said first phase separator;
    a second phase separator for receiving heated second absorption liquid from said second regenerator and for separating the heated second absorption liquid into coolant vapor and a third absorption liquid which has a lower concentration of liquid coolant and a higher concentration of absorption medium than said second absorption liquid;
    a condenser for cooling and liquefying the coolant vapor produced at said second phase separator to form liquid coolant;
    an evaporation chamber in which the liquid coolant formed at said condenser is dispensed to evaporate in said evaporation chamber;
    an absorption chamber communicating with said evaporation chamber, said third absorption liquid produced at said second phase separator being dispensed in said absorption chamber for absorbing the liquid coolant evaporated in said evaporation chamber;
    said second phase separator including a first outlet from which said third absorption liquid flows for being dispensed on a wall of said absorption chamber and a second outlet from which said third absorption liquid flows when a quantity of absorption liquid in said second phase separator exceeds a predetermined amount; the apparatus further comprising:
        an overflow pipe for allowing said third absorption liquid to flow from said second outlet of said second phase separator to said absorption chamber; and
        a valve for closing said overflow pipe in response to an increase in the temperature of the third absorption liquid.

2. An apparatus according to claim 1, wherein said liquid coolant is water and said absorption medium is lithium bromide.

3. An apparatus according to claim 1, wherein said valve is a thermal valve of the type which includes a bellows filled with a material that expands in response to said increase in temperature of the absorption liquid flowing in said overflow pipe.

4. An absorption-type air-conditioning apparatus, the apparatus comprising:
    a first regenerator for heating a first absorption liquid which is a solution of a liquid coolant and an absorption medium,
    a first phase separator for receiving heated first absorption liquid from said first regenerator and for separating the heated first absorption liquid into a coolant vapor and a second absorption liquid which has a lower concentration of liquid coolant and a higher concentration of absorption medium than said first absorption liquid;
    a second regenerator, operating at a lower temperature than said first regenerator, for receiving said second absorption liquid from said first phase separator and heating said second absorption liquid by using said coolant vapor outputted from said first phase separator;
    a second phase separator for receiving heated second absorption liquid from said second regenerator and for separating the heated second absorption liquid into coolant vapor and a third absorption liquid which has a lower concentration of liquid coolant and a higher concentration of absorption medium than said second absorption liquid;
    a condenser for cooling and liquefying the coolant vapor produced at said second phase separator to form liquid coolant;

an evaporation-absorption chamber in which the liquid coolant formed at said condenser is dispensed to evaporate in said evaporation-absorption chamber, and in which said third absorption liquid produced at said second phase separator is dispensed for absorbing the liquid coolant evaporated in said evaporation-absorption chamber;

said second phase separator including a first outlet from which said third absorption liquid flows for being dispensed on a wall of said evaporation-absorption chamber and a second outlet from which said third absorption liquid flows when a quantity of absorption liquid in said second phase separator exceeds a predetermined amount; the apparatus further comprising:

an overflow pipe for allowing said third absorption liquid to flow from said second outlet of said second phase separator to said evaporation-absorption chamber; and a valve for closing said overflow pipe in response to an increase in the temperature of the third absorption liquid.

5. An apparatus according to claim 4, wherein said liquid coolant is water and said absorption medium is lithium bromide.

6. An apparatus according to claim 4, wherein said valve is a thermal valve of the type which includes a bellows filled with a material that expands in response to said increase in temperature of the absorption liquid flowing in said overflow pipe.

7. A method of operating an absorption-type air conditioner, the method comprising the steps of:

allowing an absorption liquid to flow from a first outlet of a phase separator to means for dispensing said absorption liquid on a wall of an absorption chamber;

when a quantity of absorption liquid in said phase separator exceeds a predetermined amount, allowing said absorption liquid to flow from a second outlet of said phase separator to by-pass said means for dispensing; and when the temperature of the absorption liquid in said phase separator exceeds a predetermined temperature, closing said second outlet of said phase separator.

8. A method according to claim 7, wherein said second allowing step includes allowing said absorption liquid to flow to a bottom of said absorption chamber.

9. A method according to claim 7, wherein said closing step includes closing a thermal valve at said second outlet.

10. An absorption-type air-conditioning apparatus, the apparatus comprising:

a first regenerator for heating a first absorption liquid which is a solution of a liquid coolant and an absorption medium;

a first phase separator for receiving heated first absorption liquid from said first regenerator and for separating the heated first absorption liquid into a coolant vapor and a second absorption liquid which has a lower concentration of liquid coolant and a higher concentration of absorption medium than said first absorption liquid;

a second regenerator, operating at a lower temperature than said first regenerator, for receiving said second absorption liquid from said first phase separator and heating said second absorption liquid by using said coolant vapor outputted from said first phase separator;

a second phase separator for receiving heated second absorption liquid from said second regenerator and for separating the heated second absorption liquid into coolant vapor and a third absorption liquid which has a lower concentration of liquid coolant and a higher concentration of absorption medium than said second absorption liquid;

a condenser for cooling and liquefying the coolant vapor produced at said second phase separator to form liquid coolant;

an evaporation chamber in which the liquid coolant formed at said condenser is dispensed to evaporate in said evaporation chamber;

an absorption chamber communicating with said evaporation chamber, said third absorption liquid produced at said second phase separator being dispensed in said absorption chamber for absorbing the liquid coolant evaporated in said evaporation chamber;

said second phase separator including a first outlet from which said third absorption liquid flows for being dispensed on a wall of said absorption chamber and a second outlet from which said third absorption liquid flows when a quantity of absorption liquid in said second phase separator exceeds a predetermined amount; the apparatus further comprising:

an overflow pipe for allowing said third absorption liquid to flow from said second outlet of said second phase separator to said absorption chamber; and a valve for closing said overflow pipe when a pressure level in said second phase separator exceeds a predetermined level.

11. An absorption-type air-conditioning apparatus, the apparatus comprising:

a first regenerator for heating a first absorption liquid which is a solution of a liquid coolant and an absorption medium, a first phase separator for receiving heated first absorption liquid from said first regenerator and for separating the heated first absorption liquid into a coolant vapor and a second absorption liquid which has a lower concentration of liquid coolant and a higher concentration of absorption medium than said first absorption liquid;

a second regenerator, operating at a lower temperature than said first regenerator, for receiving said second absorption liquid from said first phase separator and heating said second absorption liquid by using said coolant vapor outputted from said first phase separator;

a second phase separator for receiving heated second absorption liquid from said second regenerator and for separating the heated second absorption liquid into coolant vapor and a third absorption liquid which has a lower concentration of liquid coolant and a higher concentration of absorption medium than said second absorption liquid;

a condenser for cooling and liquefying the coolant vapor produced at said second phase separator to form liquid coolant;

an evaporation-absorption chamber in which the liquid coolant formed at said condenser is dispensed to evaporate in said evaporation-absorption chamber, and in which said third absorption liquid produced at said second phase separator is dispensed for absorbing the liquid coolant evaporated in said evaporation-absorption chamber;

said second phase separator including a first outlet from which said third absorption liquid flows for being dispensed on a wall of said evaporation-absorption chamber and a second outlet from which said third absorption liquid flows when a quantity of absorption liquid in said second phase separator exceeds a predetermined amount; the apparatus further comprising:

an overflow pipe for allowing said third absorption liquid to flow from said second outlet of said second phase separator to said evaporation-absorption chamber; and a valve for closing said overflow pipe when a pressure level in said second phase separator exceeds a predetermined level.

12. An absorption-type air-conditioning apparatus, the apparatus comprising:

a first regenerator for heating a first absorption liquid which is a solution of a liquid coolant and an absorption medium;

a first phase separator for receiving heated first absorption liquid from said first regenerator and for separating the heated first absorption liquid into a coolant vapor and a second absorption liquid which has a lower concentration of liquid coolant and a higher concentration of absorption medium than said first absorption liquid;

a second regenerator, operating at a lower temperature than said first regenerator, for receiving said second absorption liquid from said first phase separator and heating said second absorption liquid by using said coolant vapor outputted from said first phase separator;

a second phase separator for receiving heated second absorption liquid from said second regenerator and for separating the heated second absorption liquid into coolant vapor and a third absorption liquid which has a lower concentration of liquid coolant and a higher concentration of absorption medium than said second absorption liquid;

a condenser for cooling and liquefying the coolant vapor produced at said second phase separator to form liquid coolant;

an evaporation chamber in which the liquid coolant formed at said condenser is dispensed to evaporate in said evaporation chamber;

an absorption chamber communicating with said evaporation chamber, said third absorption liquid produced at said second phase separator being dispensed in said absorption chamber for absorbing the liquid coolant evaporated in said evaporation chamber;

said second phase separator including a first outlet from which said third absorption liquid flows for being dispensed on a wall of said absorption chamber and a second outlet from which said third absorption liquid flows when a quantity of absorption liquid in said second phase separator exceeds a predetermined amount; the apparatus further comprising:

an overflow pipe for allowing said third absorption liquid to flow from said second outlet of said second phase separator to said absorption chamber; and a valve for closing said overflow pipe when a difference between respective pressure levels in said second phase separator and in said absorption chamber exceeds a predetermined level.

13. An absorption-type air-conditioning apparatus, the apparatus comprising:

a first regenerator for heating a first absorption liquid which is a solution of a liquid coolant and an absorption medium, a first phase separator for receiving heated first absorption liquid from said first regenerator and for separating the heated first absorption liquid into a coolant vapor and a second absorption liquid which has a lower concentration of liquid coolant and a higher concentration of absorption medium than said first absorption liquid;

a second regenerator, operating at a lower temperature than said first regenerator, for receiving said second absorption liquid from said first phase separator and heating said second absorption liquid by using said coolant vapor outputted from said first phase separator;

a second phase separator for receiving heated second absorption liquid from said second regenerator and for separating the heated second absorption liquid into coolant vapor and a third absorption liquid which has a lower concentration of liquid coolant and a higher concentration of absorption medium than said second absorption liquid;

a condenser for cooling and liquefying the coolant vapor produced at said second phase separator to form liquid coolant;

an evaporation-absorption chamber in which the liquid coolant formed at said condenser is dispensed to evaporate in said evaporation-absorption chamber, and in which said third absorption liquid produced at said second phase separator is dispensed for absorbing the liquid coolant evaporated in said evaporation-absorption chamber;

said second phase separator including a first outlet from which said third absorption liquid flows for being dispensed on a wall of said evaporation-absorption chamber and a second outlet from which said third absorption liquid flows when a quantity of absorption liquid in said second phase separator exceeds a predetermined amount; the apparatus further comprising:

an overflow pipe for allowing said third absorption liquid to flow from said second outlet of said second phase separator to said evaporation-absorption chamber; and a valve for closing said overflow pipe when a difference between respective pressure levels in said second phase separator and in said evaporation-absorption chamber exceeds a predetermined level.

* * * * *

UNITED STATES PATENT AND TRADEMARK OFFICE
CERTIFICATE OF CORRECTION

PATENT: 5,819,553

DATED: October 13, 1998

INVENTOR (S): Katsusuke Ishiguro

It is certified that error appears in the above-identified patent and that said Letters Patent is hereby corrected as shown below:

Column 6, line 65, delete "electromagnetic" and insert --electro-magnetic--.

Signed and Sealed this

Twenty-ninth Day of June, 1999

*Attest:*

Q. TODD DICKINSON

*Attesting Officer*  Acting Commissioner of Patents and Trademarks